United States Patent [19]
Iwamoto et al.

[11] Patent Number: 6,119,900
[45] Date of Patent: Sep. 19, 2000

[54] LEVER OPERATING MECHANISM FOR AIR-PRESSURE UTILIZING HOT POT

[75] Inventors: Yoshihiro Iwamoto; Futoshi Yabuuchi, both of Osaka, Japan

[73] Assignee: Allgo Co., Ltd., Osaka, Japan

[21] Appl. No.: 09/204,675

[22] Filed: Dec. 3, 1998

[30] Foreign Application Priority Data

Oct. 29, 1998 [JP] Japan .................................. 10-307947

[51] Int. Cl.$^7$ .................................................. B65D 37/00
[52] U.S. Cl. ...................... 222/209; 222/153.13; 222/401
[58] Field of Search .................................... 222/209, 401, 222/633, 632, 631, 153.13

[56] References Cited

U.S. PATENT DOCUMENTS

| | | | |
|---|---|---|---|
| 3,905,520 | 9/1975 | Nishioka | 222/209 |
| 4,174,053 | 11/1979 | Shimizu | 222/209 |
| 5,887,760 | 3/1999 | Johnson | 222/209 |

*Primary Examiner*—Kevin Shaver
*Assistant Examiner*—Thach Bui
*Attorney, Agent, or Firm*—Price, Gess & Ubell

[57] ABSTRACT

The lever operating mechanism for air-pressure utilizing hot pots referred to in the present invention that have a simple construction of lever operating mechanism, is able to raise and collapse the lever and maintain the lever raised and collapsed condition extremely easily and smoothly, and achieves superb operability and satisfactory discharge because all the operations can be carried out simply by moving the free end of the operating lever up and down with only one finger.

The lever operating mechanism of the air-pressure utilizing hot pot referred to in the present invention comprises a compression process in which the free end of the operating lever is raised from the operating lever contained condition, and the operating lever, arm, and inside lever are engaged and operated in linkage to bring the bellows pump into the compressible condition, an operating lever downwards movement process in which the operating lever is operated to move downwards and the bellows pump is pressed down during this compression process, an operating lever return process for returning the operating lever, a lever sliding process where the free end of the operating lever of this operating lever return process is raised more greatly than the operating lever in the compression process and the base end side end of the operating lever compresses to slide the base end side end of the inside lever forwards, an arm moving process where the arm base end side is moved to the inwards front of the lid as the inside lever moves forwards in the lever sliding process, an arm leaving process where the arm is allowed to leave from the operating lever, an operating lever collapsing process where the operating lever is contained after this arm moving process, and a lever containing process where the operating lever support rod portion of the operating lever collapsing process comes in contact with the inside lever pin portion and the inside lever is moved backwards together with the arm and the operating lever is brought into the contained condition.

8 Claims, 9 Drawing Sheets

LEVER OPERATING MECHANISM FOR AIR-PRESSURE UTILIZING HOT POT

BACKGROUND OF THE INVENTION

1. Field of the Invention

The present invention relates to a lever operating mechanism for applying air-pressure to hot pots for discharging the liquid inside the hot pot to the outside as a result of the lever operation.

2. Description of the Prior Art

Hitherto, a lever operating mechanism for a hot pot such as a vacuum bottle or flask utilizing air pressure has a lever inside a lid for compressing a bellows pump contained within the lid (hereinafter called the "inside lever"), an operating lever for operating this inside lever from outside of the lid, and an arm inside the lid for transmitting the operating condition of this operating lever to the inside lever, the base end sides of the inside lever are and the operating lever rotatably pivoted to a mount frame fixed to the rear end of the lid, and the base end side of the arm is rotatably pivoted to the vicinity of the lever center so that the liquid inside the inner container can be discharged to the outside through a liquid discharge passage with pressurized air from the bellows pump by the operation of the operating lever.

However, in a lever operating mechanism of this kind of conventional air-pressure utilizing hot pots, this lever operating mechanism is so complicated that it is difficult to smoothly raise and collapse the lever and maintain the lever in a raised and collapsed condition, resulting in problems of poor operability, complicated construction, maloperation, and unsatisfactory discharge.

SUMMARY OF THE INVENTION

Accordingly, in order to solve the problems which the lever operating mechanism of this kind of conventional air-pressure utilizing hot pots have experienced, it is an object of the present invention to provide a lever operating mechanism for air-pressure utilizing hot pots that have a simple construction of lever operating mechanism, is able to raise and collapse the lever and maintain the lever in a raised and collapsed condition extremely easily and smoothly, and achieves superb operability and satisfactory discharge because all the operations can be carried out simply by moving the free end of the operating lever up and down with only one finger.

To achieve the foregoing objects, the lever operating mechanism of the air-pressure utilizing hot pot referred to in the present invention comprises a compression process in which the free end of the operating lever is raised from an operating lever contained condition, and the operating lever, arm, and inside lever are engaged and operated in linkage to bring the bellows pump into the compressible condition, wherein the operating lever is operated to move downwards and the bellows pump is pressed down during this compression process. An operating lever return process for returning the operating lever includes a lever sliding process where the free end of the operating lever is raised more greatly than the operating lever in the compression process and the base end side end of the operating lever compresses to slide the base end side end of the inside lever forwards, and the arm base end side is moved to the inwards front of the lid as the inside lever moves forward in the lever sliding process, an arm leaving process where the arm is allowed to leave from the operating lever, an operating lever collapsing process where the operating lever is contained after this arm moving process, and a lever containing process where the operating lever support rod portion of the operating lever collapsing process comes in contact with the inside lever pin portion and the inside lever is moved backwards together with the arm and the operating lever is brought into the contained condition. In addition, it is configured for the operating lever to operate each process by allowing its free end to make vertical movement only. Furthermore, an insertion hole is provided at the lid top rear portion to enable arm rotation. In addition, an L-shape through hole is provided to the mount frame of the lid so that the inside lever base end side can be freely slid longitudinally. It is also configured that the operating lever has an operating lever spring provided at the operating lever base end side pivoted to the mount frame so that the operating lever can be maintained in the constantly collapsed condition. In addition, it is configured that to the operating lever, latching pieces for latching the arm free end are equipped. Furthermore, because the arm has an arm spring provided on the arm base end side so that the arm can maintain constantly an erect condition.

DETAILED DESCRIPTION OF THE PREFERRED EMBODIMENTS

Referring now to the drawings, preferred embodiments according to the invention will be described in detail hereinafter.

Figure 1:
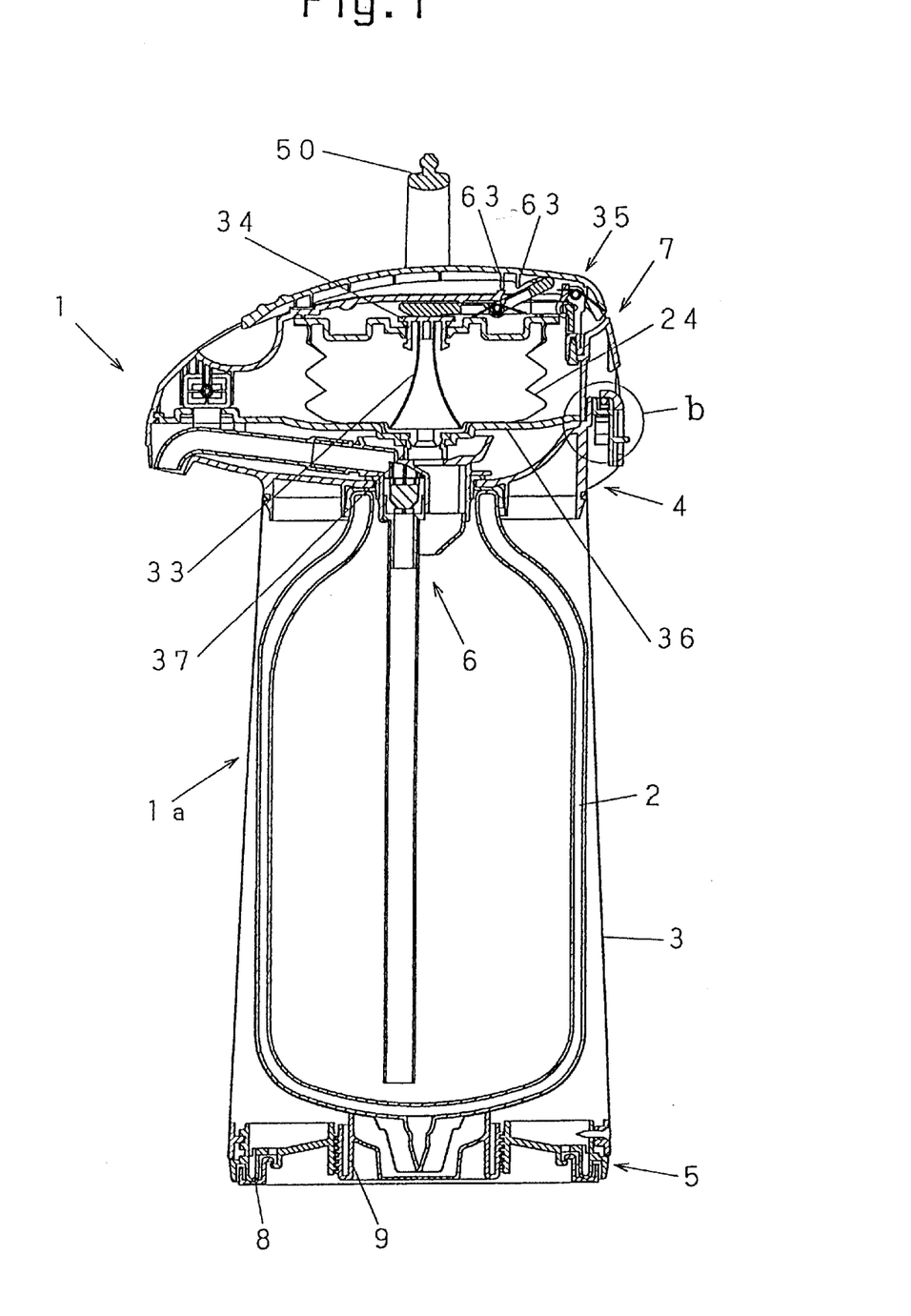
FIG. 1 is a vertical sectional view of an air-pressure utilizing hot pot of an embodiment according to the present invention.

A hot pot 1 comprises an inner container 2, an outer case 3 surrounding the inner container 2, a shoulder member 4 forcibly fitted to connect to the top end of the outer case 3, a hot pot proper 1a equipped with a bottom member 5 connected to the bottom end of the outer case 3, an inside plug 6 to be removably mounted from the center opening of the shoulder member 4, and a lid 7 to be openably equipped to the top end surface of the shoulder member 4 which contains a bellows pump 24. Numeral 50 designates a handle.

The inner container 2 is a single bottle or vacuum double bottle made of glass or metallic material such as stainless steel, etc.

The outer case 3 has a thin iron plate bent into a cylindrical form, the top end bent inwards, and a threaded ring is fitted into the bottom portion to curl inwards.

The shoulder member 4 comprises, as shown in FIG. 1, a nearly cone-shaped pan portion with the center open, an annular fit portion trailing from the protruded end of the pan portion, a hinge portion to which the lid 7 later discussed is mounted at the rear of the annular fit portion, and a beak portion protruding towards the front of the pan portion.

The center opening of the pan portion of the shoulder member 4 is in free communication with the inside of the inner container 2 through seal packing at the mouth of the inner container 2.

To the outer circumference wall of the annular fit portion of the shoulder member 4, an annular groove is provided to fit the bent portion of the top end of the outer case 3.

The beak portion of the shoulder member 4 has the front of the pan portion recessed to be in free communication with the center opening of the pan portion.

To this beak portion, an opening which allows a discharge pipe later discussed to pass through is provided, and on the right and left side wall insides, snap rings for lock pawls for latching the lock pawls for locking device of the lid 7 are provided, to be later discussed.

The bottom member 5 comprises a ring-form bottom plate 8 to be screwed down to the threaded ring on the bottom end inside of the outer case 3 and a tightening member 9 which is screwed down to the center opening of the bottom plate 8 and pushes up the inner container 2.

Figure 10:
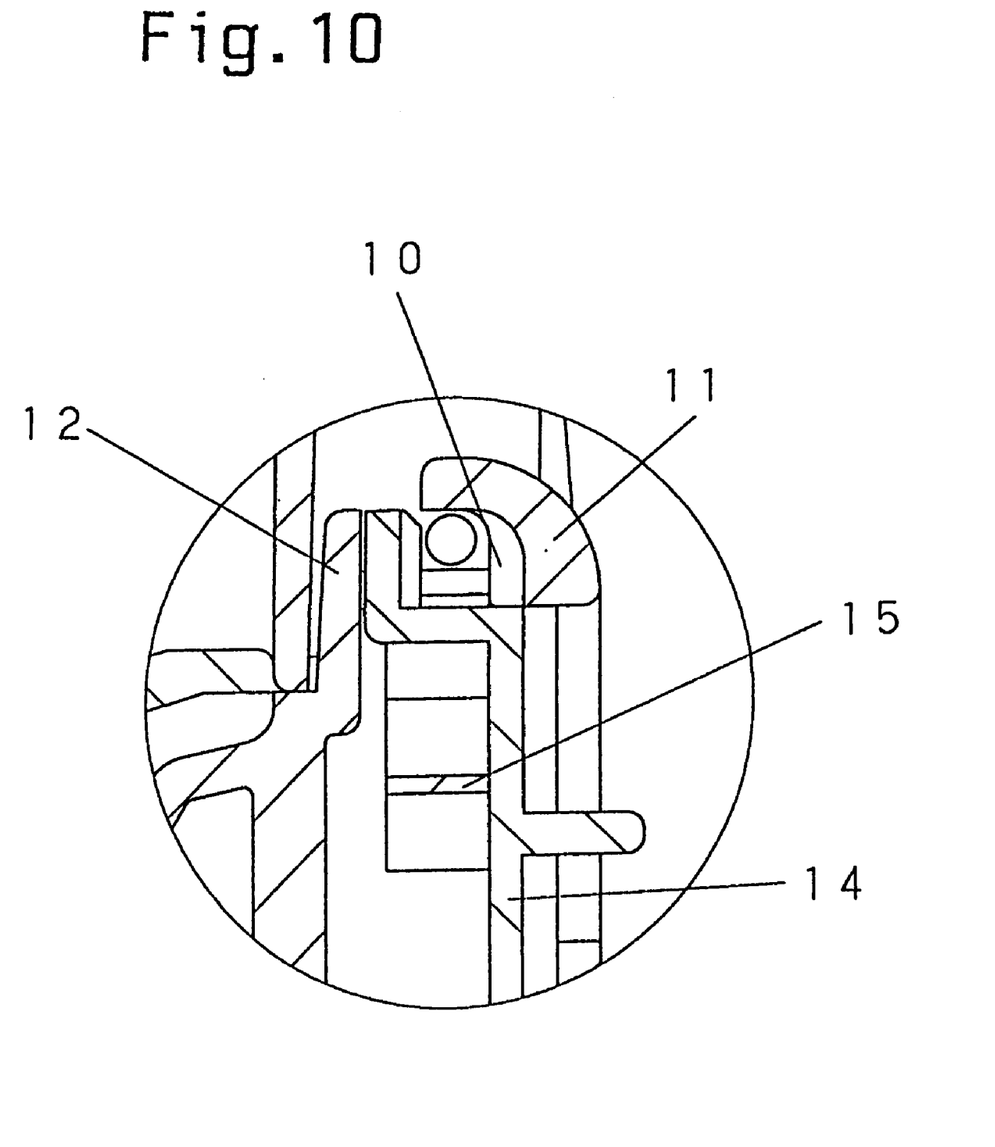
FIG. 10 is an enlarged view of "b" of FIG. 1.
Figure 12:
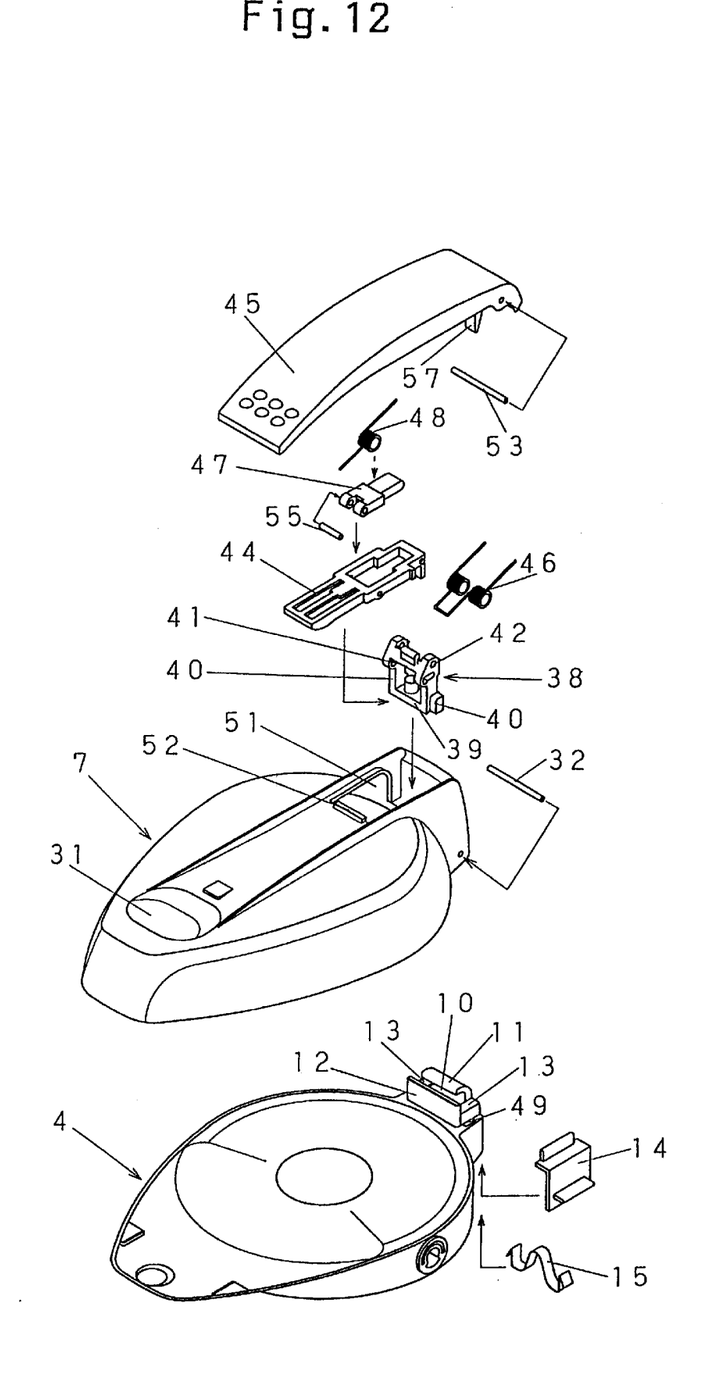
FIG. 12 is a disassembled perspective view showing a principal portion of the embodiment according to the present invention.

The hinge portion of the shoulder member 4 comprises, as shown in FIG. 10 and FIG. 12, a U-shaped latching portion 11 with groove 10 for rockably pivoting hinge pins of the lid 7 later discussed, a front wall portion 12 which is located in front of this U-shaped latching portion 11 and prevents the hinge pins of the lid 7 from leaving in a forward direction, and right and left side wall portions 13, 13 which connect the U-shaped latching portion 11 with the front wall portion 12 and has the center open from the bottom end.

To this hinge portion, a vertically movable check plate 14 for restricting the forward movement of the hinge pin of the lid 7 fitted into the groove 10 of the U-shaped latching portion 11, and a spring plate 15 for a the check plate for vertically slidably mounting of the check plate 14 to the right and left side wall portions 13, 13 of the hinge portion are provided. This spring plate for check plate 15 is mounted by inserting both ends into the spring plate holes for check plate 49, 49 of the right and left side wall portions 13, 13 of the hinge portion.

The check plate 14 has the top end protruded between the front of the U-shape latching portion 11 of the hinge portion and the front wall portion 12 to prevent the hinge pin of the lid 7 from moving forward.

To allow this lid 7 to leave the hinge portion, the check plate 14 is pressed down against the spring plate for check plate 15, and the hinge pin of the lid 7 is allowed to move forward from the groove 10 of the U-shaped latching portion 11 with the gap between the U-shaped latching portion 11 of the hinge portion and the front wall portion 12 held open widely and pulled up above the gap between the U-shaped latching portion 11 and the front wall portion 12.

Figure 11:
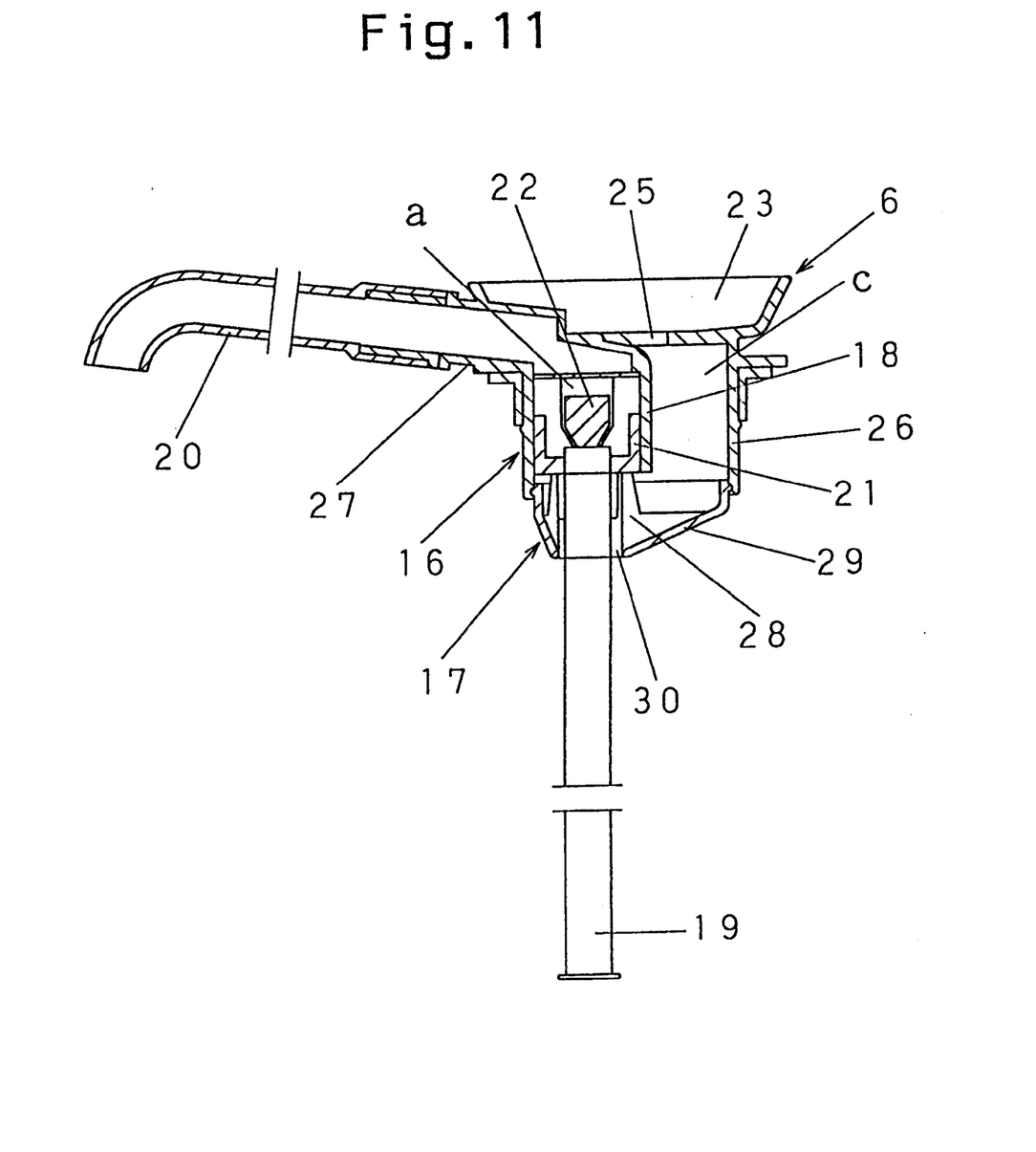
FIG. 11 is an enlarged partly vertical sectional view of an inside plug of the embodiment according to the present invention.

The inside plug 6 comprises, as shown in FIG. 11, an inside plug proper 16, a lower lid for inside plug 17 for covering the lower surface of the inside plug proper 16, an upper inner cylinder 18 which forms a liquid passage "a" in the inside plug proper 16, a pumping pipe 19 for pressure-feeding the liquid inside the inner container 2 into the upper inner cylinder 18, a discharge pipe 20 for discharging the liquid in the upper inner cylinder 18 into the outside ahead of the hot pot 1, and a lower inner cylinder 21 which is connected to the lower end of the upper inner cylinder 18 and pushed up by the lower lid for inner plug 17. This pumping pipe 19, the liquid passage "a" inside the inner plug proper 16, and the discharge pipe 20 form a liquid discharge passage for discharging the liquid outside. Numeral 22 is a stop valve for preventing the liquid from being discharged from the pumping pipe 19 to the discharge pipe 20 when the hot pot is turned over.

The inside plug proper 16 has a funnel type receiver portion 23 integrally formed on the top surface, to the center top surface of this receiver portion 23, an opening 25 is drilled to be in free communication with the air passage "c" in the inside plug proper 16, the upper inner cylinder 18 which forms the liquid passage "a" is provided ahead of the lower portion of the inside plug proper 16, an external cylinder 26 for the air passage "c" is provided at the back of the lower portion, and a connection pipe 27 in free communication with the liquid passage is integrally formed as part of the top surface of the liquid passage. The lower inner cylinder 21 forms a liquid passage "a" by allowing the top end to be in free communication with the upper inner cylinder 18, and is compressed upwards by a rib 28 of the lower lid for the inside plug 17 by fitting the top portion of the pumping pipe 19 to the lower portion.

The lower lid for inside plug 17 is formed in a cylindrical shape with the top portion as a wide mouth and the lower portion as a narrow mouth, and from the upper wide mouth to the lower narrow mouth which connect the external cylinder 26 of the inside plug proper 16, a side wall 29 is made gradient to form an air passage "o" together with the external cylinder 26. With the lower narrow mouth of the lower lid for inside plug 17 is made a through hole 30, which is formed to surround the neighborhood of the pumping pipe 19 in free communication with the lower inner cylinder 21. This through hole 30 is formed greater than the outside diameter of the pumping pipe 19. The lower inner cylinder 21 is formed separately from the lower lid for the inside plug 17, but it may be formed integral with the lower lid for the inside plug 17.

The lid 7 is rockably pivoted to the hinge portion of the shoulder member 4 via a hinge pin 32, and openably mounted to the shoulder member 4 with locking pawls of the locking device the lid contains a bellows pump 24, a first spring 33 which pushes up the bellows pump 24, a push valve 34 for opening and closing the upper opening of the bellows pump 24, and a lever operating mechanism 35 for compressing the push valve 34 and for pressure-feeding air inside the bellows pump 24 into the inner container 2, and covers the bottom surface with a bottom plate 36, and has a rubber bush 37 fitted to the center opening of the bottom plate 36 in free communication with the opening 25 of the receiving portion 23 of the inner plug proper 16.

Figure 13:
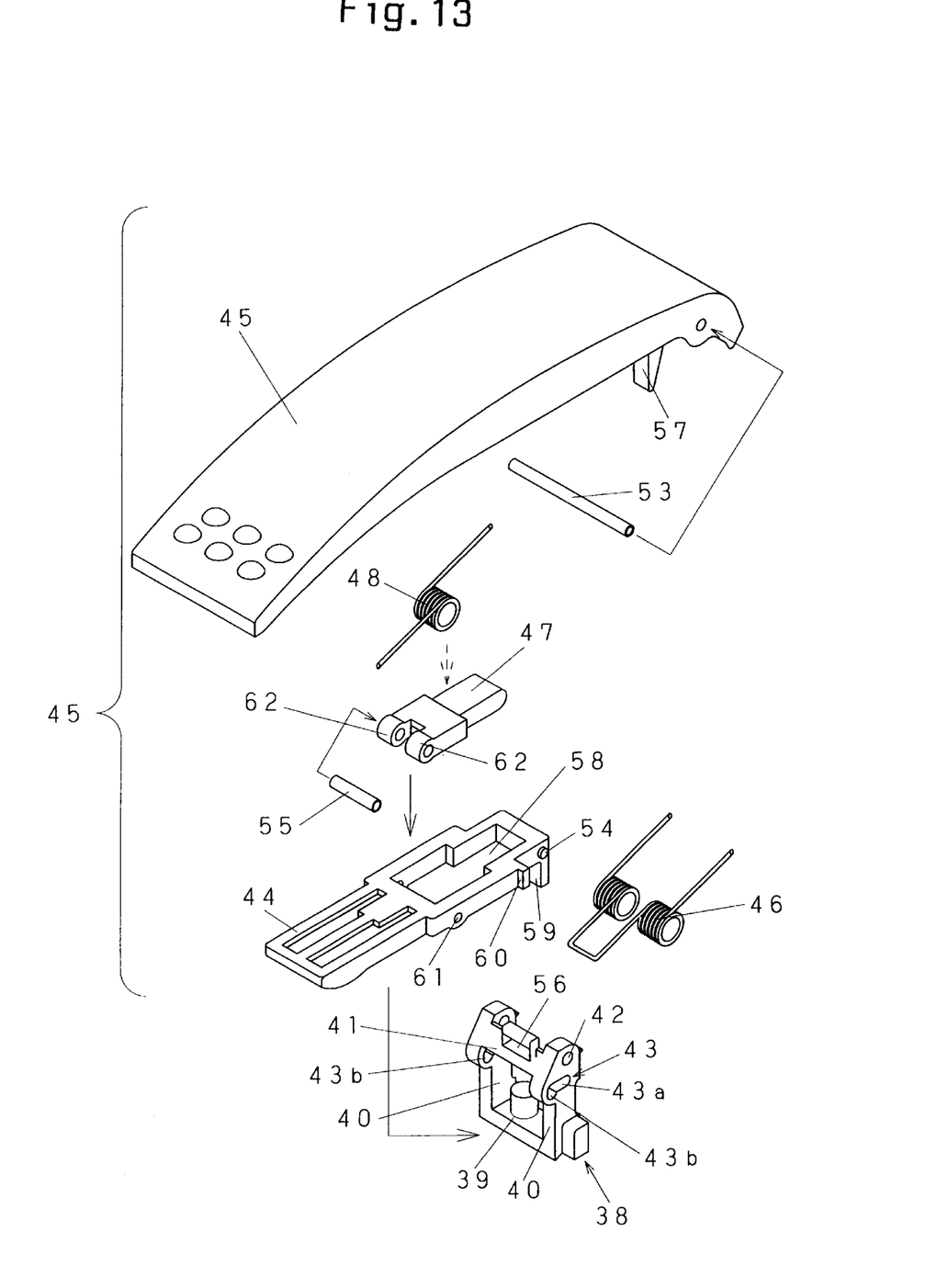
FIG. 13 is a disassembled perspective view showing a lever operating mechanism of the embodiment according to the present invention.

The lid 7 is formed with a hollow inside, and forms an insertion hole 51 at the upper surface rear portion as shown in FIG. 12 and FIG. 13, so that rotation of an arm 47 of a lever operating mechanism 35 later discussed is not impeded. This lid 7 fixes a mount frame 38 for rotatably pivoting an operating lever 45 and an inside lever 44 of the lever operating mechanism 35 to the rear side of the insertion hole 51 of the rear inner surface.

In the front upper portion of the insertion hole 51 of the lid 7, a guide piece 52 for regulating the front rotation of the arm 47 later discussed is provided. Numeral 31 is a finger-recess for applying a finger to the lower side of the free end of the tip end portion of the operating lever 45.

The mount frame 38 is formed, as shown in FIG. 13, integrally with a fixing portion 39 to be screwed to the rear inner surface of the lid 7 on the bottom, two side frame portions 40, 40 extending from both sides of the fixing portion 39 and located on the opposite sides, and a coupling portion 41 for coupling these two side frame portions 40, 40 with the upper front.

The two side frame portions 40, 40 of the mount frame 38 have a through hole 42 for a shaft pin for pivoting the shaft pin 53 on the base end side of the operating lever 45 of the lever operating mechanism 35 later discussed, both located opposite on the upper portions, respectively, and an L-shape through hole 43 for pivoting a lever shaft pin 54 of the base end side of the lever 44 of the lever operating mechanism 35 below the shaft pin through hole 42, respectively. The L-shape through hole 43 comprises a longitudinal hole 43a for sliding the lever shaft pin 54 in the longitudinal direction and a vertical hole 43b for sliding the lever shaft pin 54 in the vertical direction ahead of the longitudinal hole 43a. Numeral 56 is a fixing hole for latching one end of a spring 46 for the operating lever later discussed.

The bellows pump 24 is formed with the bellows and thick upper plate portion and lower plate portion at the top and the bottom ends of the bellows, and at the center of the upper plate portion, a top opening is provided for air supply, and at the center of the lower plate portion, a hollow air exhaust cylinder portion is provided.

The push valve 34 is formed integral with a top flat plate portion and a plurality of pawls trailingly mounted downwards from the bottom surface of the flat plate portion whose the tip end comes in contact with the bottom surface of the circumferential wall which forms an top opening of the upper plate portion of the bellows pump 24.

The first spring 33 has the bottom end in contact with the top surface of the lower plate portion in the bellows pump 24 and the top end in contact with the pawl inside at the bottom surface of the flat plate portion of the push valve 34.

The lever operating mechanism 35 comprises, as shown in FIG. 13, the inside lever 44 in the lid for compressing the bellows pump 24, the operating lever 45 for operating the inside lever 44 on the outer surface of the upper wall of the lid, the operating lever spring 46 which acts to holding this operating lever 45 in the contained condition, the arm 47 inside the lid for transmitting the operating condition of this operating lever 45 to the inside lever 44, and an arm spring 48 which acts to raise and hold this arm 47. Numeral 53 is the operating lever shaft pin and numeral 55 is an arm shaft pin.

The operating lever 45 of the lever operating mechanism 35 has, as shown in FIG. 13, the tip end portion made into a free end and the rear end portion made into a base end side, and has this base end side vertically rotatably pivoted to the shaft pin through hole 42 of the mount frame 38 with the operating lever shaft pin 53. This operating lever 45 forms a latching piece 63 trailing in a bifurcate shape for latching the free end of the arm 47 to the inner wall ahead from the base end side of the rear end portion as shown in FIG. 1. Numeral 57 is a support rod portion for moving the lever 44 backwards together with the arm 47 by coming in contact with a pin portion 60 of the lever 44 at the lower portion on both right and left sides of the operating lever 45.

The lever 44 of the lever operating mechanism 35 is formed into a nearly flat plate form as shown in FIG. 13, and has a hollow hole 58 formed at the rear center in such a manner to prevent obstruction of vertical rotation of the arm 47, with the tip end portion designated as a free end and the rear end portion as a base end side, and has the lever shaft pin 54, respectively, on the outside of both ends of this base end side. This lever shaft pin 54 is inserted from a gap between the two side frame portions 40, 40 of the mount frame 38, and is slidably pivoted in the L-shape through hole 43 of the mount frame 38.

A trailing wall 59 which comes in contact with the base end side rear end portion of the operating lever 45 is provided downwards from the rear end portion of the base end side of the lever 44. The lever 44 has the pin portion 60 in contact with the support rod portion 57 of the operating lever 45 located, respectively, on both side walls ahead from the lever shaft pin 54. Numeral 61 is a shaft hole for inserting the arm shaft pin 55.

The arm 47 of the lever operating mechanism 35 has a shaft portion 62 formed in a bifurcate shape notched at the center as shown in FIG. 13, and by inserting one arm shaft pin 55 into this bifurcate shaft portion 62, the arm shaft pin 55 is inserted into the shaft hole 61 of the lever 44. The arm 47 has the tip end portion as a free end portion.

The arm spring 48 has one end in contact with the center of the bottom wall of the lever 44 and the other end in contact with the center of the bottom wall of the arm 47 to constantly hold the arm 47 in the erect condition.

Figure 2:
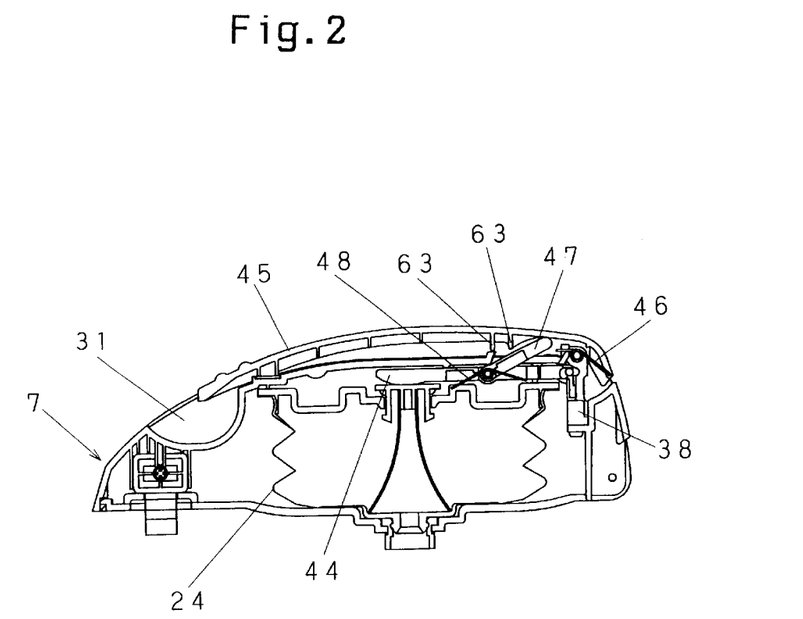
FIG. 2 is a partly vertical sectional schematic illustration showing a lever containing process of the embodiment according to the present invention.
Figure 3:
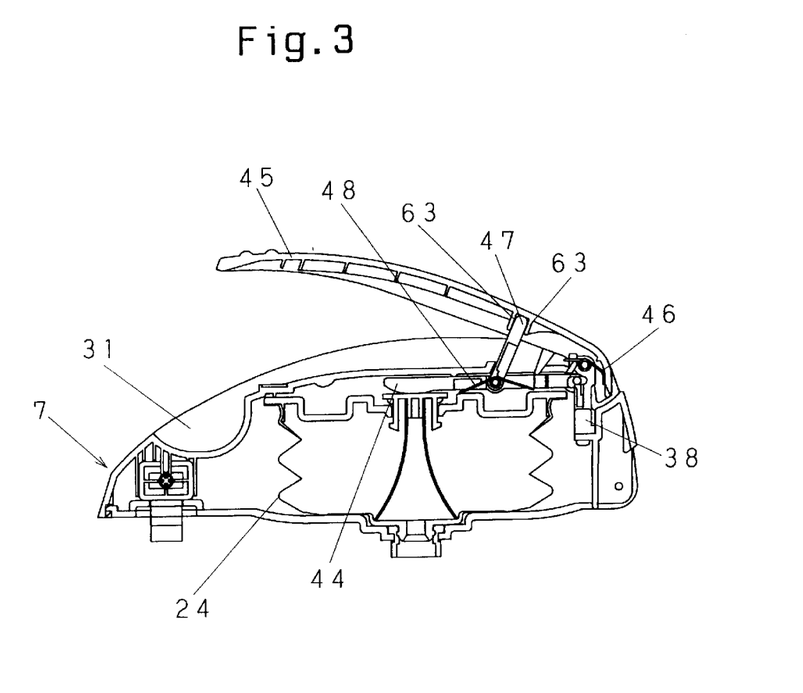
FIG. 3 is a partly vertical sectional schematic illustration showing the compressing operation process of the embodiment according to the present invention.
Figure 7:
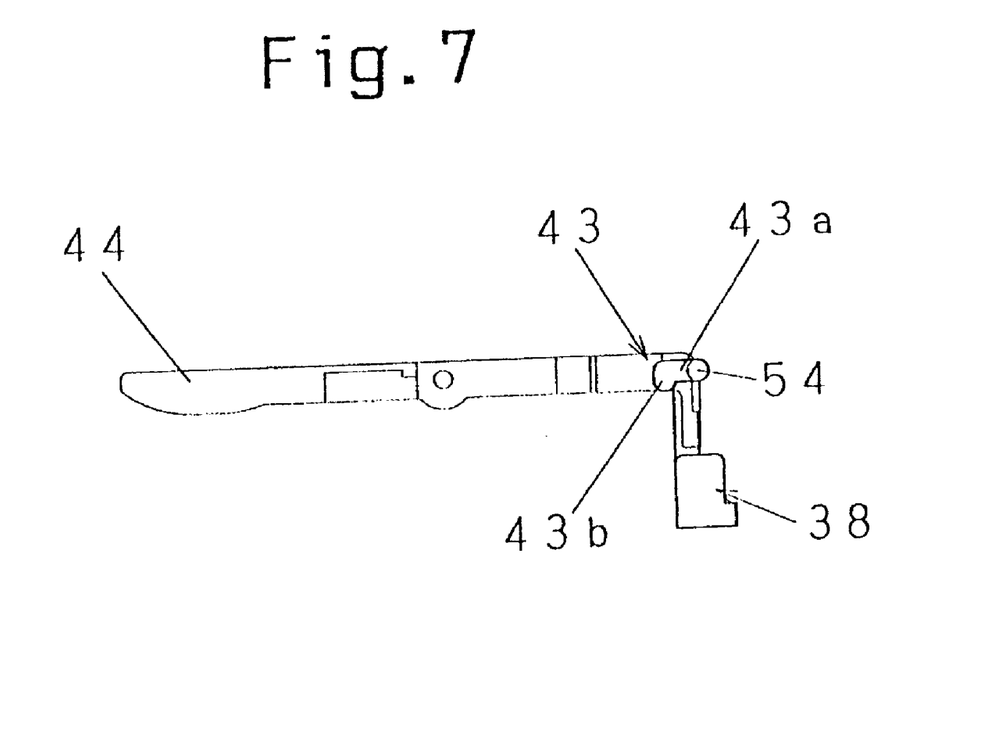
FIG. 7 is a partly vertical sectional schematic illustration showing lever sliding of the compressing operation process of the embodiment according to the present invention.

Now, discussion will be made on the operation. As shown in FIG. 2, a user can apply a finger to the free end of the operating lever 45 into the finger recess 31 of the lid 7 from the lever containing process A push it up until the free end of the arm 47 is latched between the latching pieces 63 of the operating lever 45, and raise the free end of the operating lever 45. As shown in FIG. 3, by engaging the operating lever 45, arm 47, and lever 44, it allow them to operate in linkage to bring into the compression process B where the bellows pump 24 is ready to be compressed. In this compression process B, as shown in FIG. 7, the lever shaft pin 54 of the lever 44 is located behind the longitudinal hole 43a of the L-shape through hole 43 of the mount frame 38.

Figure 4:
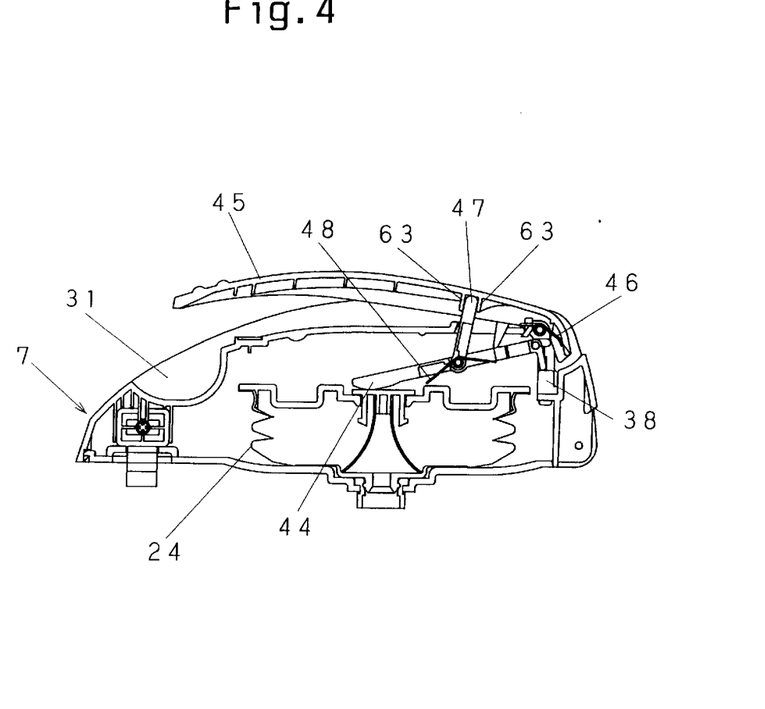
FIG. 4 is a partly vertical sectional schematic illustration showing the operating lever downward movement process of the embodiment according to the present invention.
Figure 5:
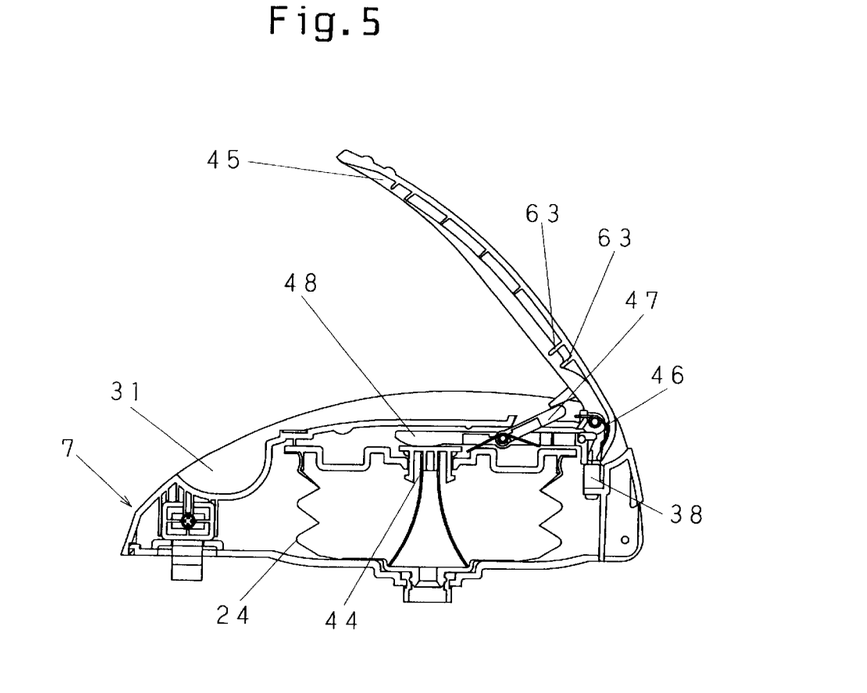
FIG. 5 is a partly vertical sectional schematic illustration showing the arm leaving process of the embodiment according to the present invention.
Figure 8:
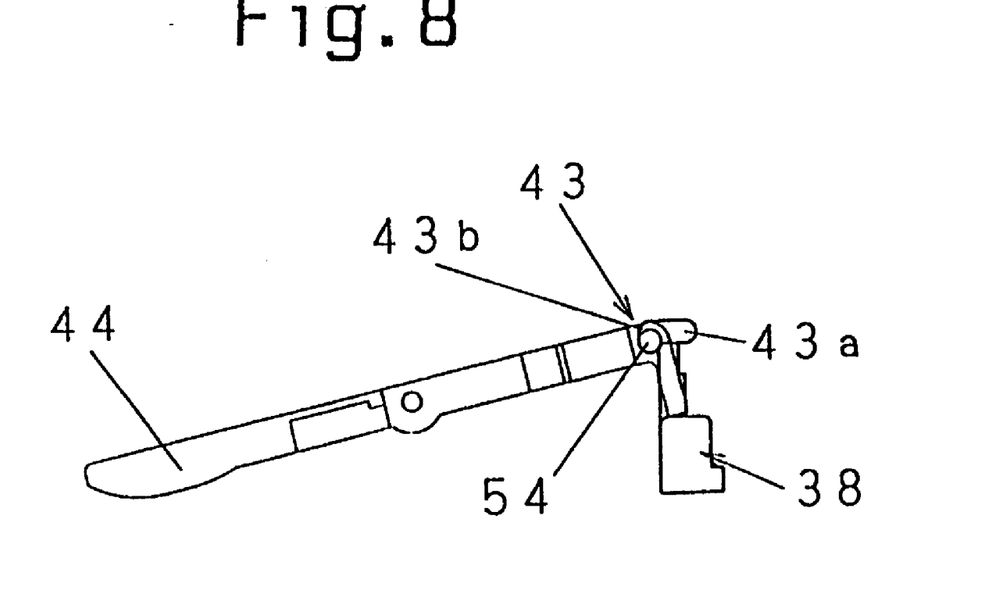
FIG. 8 is a partly vertical sectional schematic illustration showing lever sliding of the operating lever downward movement process of the embodiment according to the present invention.

Operating the lever 45 downwards during this compression process B, as shown in FIG. 4, the free end of the lever 44 presses down the push valve 34 via the arm 47, then, presses down the bellows pump 24, and brings about the operating lever downwards movement process C where compressed air is pressured into the inner container 2. In the operating lever downwards movement process C, as shown in FIG. 8, the lever shaft pin 54 of the lever 44 slides from the rear of the longitudinal hole 43a of the L-shape through hole 43 of the mount frame 38 to the front of the longitudinal hole 43, and then descends the vertical hole 43b, and is located at the bottom end of the vertical hole 43b.

After this operating lever downward movement process C, with the spring force of the first spring 33 in the bellows pump 24, the operating lever 45 is returned to the compression process B condition, which is called the operating lever return process D. During this compression process B, the operating lever downward process C and the operating lever return process D are repeated to discharge the liquid inside the inner container 2 to the outside. By repeating this operating lever downward movement process C and the operating lever return process D, the lever shaft pin 54 of the lever 44 slides from the rear of the longitudinal hole 43a of the L-shape through hole 43 of the mount frame 38 to the front of the longitudinal hole 43a, then, descends the vertical hole 43b, slides to the bottom end of the vertical hole 43b, and then, slides in the reverse direction to repeat this operation.

Figure 9:
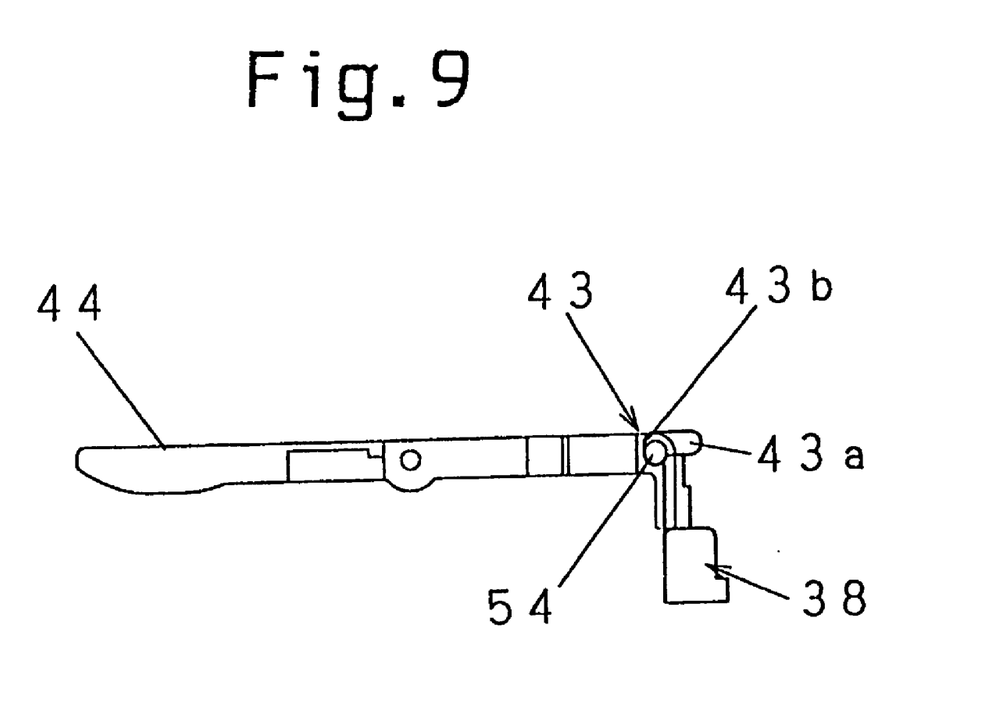
FIG. 9 is a partly vertical sectional schematic illustration showing lever sliding of the arm leaving process of the embodiment according to the present invention.

Upon completion of the discharge of the liquid, pressing the free end of the operating lever 45 more greater than the position of the operating lever 45 of the compression process B causes the rear end portion on the base end side of the operating lever 45 to come in contact with the trailing wall 59 of the inside lever 44, the inside lever sliding process E where the inside lever 44 is slid forwards, the arm moving process F in which the base end side of the arm 47 slides forwards simultaneously with this lever sliding process E and guides the base end side of the arm 47 to the front inside of the top wall of the lid 7, and the arm leaving process G in which the free end of the arm 47 is allowed to leave from the gap between latching pieces 63 of the operating lever 45 against the arm spring 48 and collapse backwards take place successively. In this arm leaving process G, as shown in FIG. 9, the lever shaft pin 54 of the lever 44 is located at the bottom end of the vertical hole 43b of the L-shaped through hole 43 of the mount frame 38.

Figure 6:
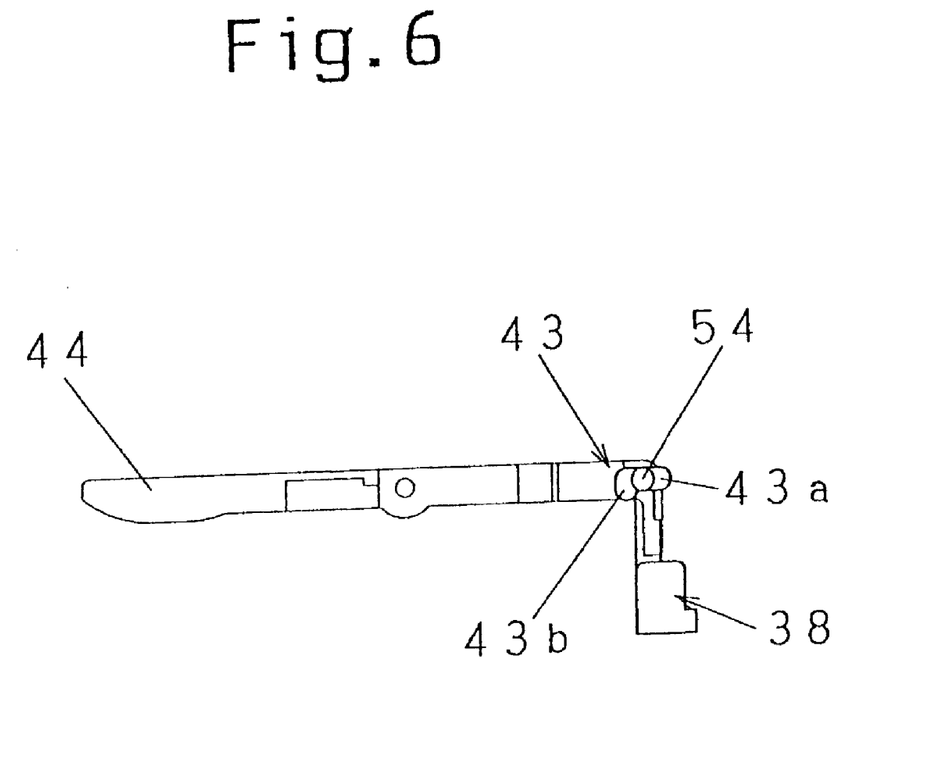
FIG. 6 is a partly vertical sectional schematic illustration showing lever sliding of the lever containing process of the embodiment according to the present invention.

In addition, after the arm moving process F, an operating lever collapsing process H where the operating lever 45 is collapsed by the operating lever spring 46 on the outer surface of the top wall of the lid 7, and the lever containing process A where the support rod portion 57 of the operating lever 45 of the operating lever collapsing process H comes in contact with the pin portion 60 of the lever 44 and at the same time moves the lever 44 backwards together with the arm 47 and the operating lever 45 is held in the contained condition. In this lever containing process A, as shown in FIG. 6, the lever shaft pin 54 of the lever 44 is located at the center of the longitudinal hole 43a of the L-shape through hole 43 of the mount frame 38.

Although the invention has been described in its representative preferred form, it is understood that the present invention shall not always be limited to these embodiment constructions but may be changed as required and practiced within the purview where they have the foregoing compositions described in the present invention, achieve the objects described in the present invention, and exhibit the effects described hereinunder, such as a kettle and electric pot which can keep warm and which utilizes air pressure to discharge, etc.

As already clear from the foregoing description, the lever operating mechanism of the air-pressure utilizing hot pot referred to in the present invention comprises a compression process in which the free end of the operating lever is raised from the operating lever contained condition, and the operating lever, arm, and inside lever are engaged and operated in linkage to bring the bellows pump into the compressible condition, an operating lever downward movement process in which the operating lever is operated to move downwards and the bellows pump is pressed down during this compression process, an operating lever return process for returning the operating lever, a lever sliding process where the free end of the operating lever of this operating lever return process is raised more greatly than the operating lever in the compression process and the base end side end of the operating lever compresses to slide the base end side end of the inside lever forward, an arm moving process where the arm base end side is moved to the inward front of the lid as the inside lever moves forward in the lever sliding process, an arm leaving process where the arm is allowed to leave from the operating lever, an operating lever collapsing process where the operating lever is contained after this arm moving process, and a lever containing process where the operating lever support rod portion of the operating lever collapsing process comes in contact with the inside lever pin portion and the inside lever is moved backwards together with the arm and the operating lever is brought into the contained condition. In addition, it is configured for the operating lever to operate each process by allowing its free end to make a vertical movement only. Furthermore, an insertion hole is provided at the lid top rear portion to enable arm rotation. In addition, an L-shape through hole is provided to the mount frame of the lid so that the inside lever base end side can be freely slid longitudinally. It is also configured that the operating lever has an operating lever spring provided at the operating lever base end side pivoted to the mount frame so that the operating lever can be maintained in the constantly collapsed condition. In addition, it is configured that to the operating lever, latching pieces for latching the arm free end are equipped. Furthermore, because the arm has an arm spring provided on the arm base end side so that the arm can maintain a constantly erect condition, the inside lever operating mechanism becomes simpler, and at the same time, the lever can be extremely easily and smoothly raised, collapsed, and maintained and furthermore, since all the operations can be carried out by moving the free end of the operating lever vertically with only one finger, outstanding effects of superb operability and satisfactory discharge can be expected.

What is claimed is:

1. A lever operating mechanism for air-pressure utilizing hot pots comprising;

a lid;

a bellows pump;

an inside lever in the lid for compressing the bellows pump contained in the lid; an operating lever for operating the inside lever from the outside of the lid; an arm inside the lid for transmitting the operating movement of the operating lever to the inside lever; a mount frame, wherein base end sides of the inside lever and the operating lever are rotatably pivoted to the mount frame fixed to a rear end of the lid, a base end side of the arm is rotatably pivoted to the inside lever, and the liquid inside an inner container is discharged outside through a liquid discharge passage with pressurized air from the bellows pump by the operation of the operating lever, wherein when a free end of the operating lever is raised from a storage position the operating lever, arm, and inside lever are engaged and operated in linkage to bring the bellows pump into the compressible condition, the operating lever is operated to move downwards and the bellows pump is pressed down during this compression process to pump liquid, when the free end of the operating lever is raised to a greater extend than the operating lever in the compression process, the base end side end of the operating lever compresses to slide the base end side end of the inside lever forward and the arm is allowed to disengage from the operating lever, wherein a support rod portion of the operating lever comes in contact with an inside lever pin portion and the inside lever is moved backwards together with the arm and the operating lever.

2. A lever operating mechanism for air-pressure utilizing hot pots recited in claim 1 wherein the operating lever operates by allowing its free end to make vertical movements.

3. A lever operating mechanism for air-pressure utilizing hot pots recited in claim 1 wherein an insertion hole is provided at a top rear portion of the lid for allowing the arm to freely rotate.

4. A lever operating mechanism for air-pressure utilizing hot pots recited in claim 1 wherein an L-shape hole is provided on the mount frame of the lid for allowing the inside lever base end side to freely slide longitudinally.

5. A lever operating mechanism for air-pressure utilizing hot pots recited in claim 1 wherein an operating lever spring is provided on the operating lever base end side pivoted to the mount frame so that the operating lever can be stored.

6. A lever operating mechanism for air-pressure utilizing hot pots recited in claim 1 wherein an operating lever is equipped with latching pieces for latching the arm free end.

7. A lever operating mechanism for air-pressure utilizing hot pots recited in claim 1 wherein an arm spring is provided on the arm base end side so that the arm is biased to an erect condition.

8. A container with a dispensing assembly for dispensing liquid comprising:

a container for holding a liquid;

an inside lever;

a lid;

a bellows pump connected to the container to dispense the liquid;

an operating lever movably mounted on the lid; and an arm movably mounted within the lid for providing an operating link between the operating lever, the inside lever, and the bellows pump to enable a user to move the operating lever to pump liquid from the container; the arm is biased to operatively engage the operating lever at a first position upon a first movement of the operating lever and the arm is disengaged from the first position and positioned in a second storage position upon a second movement of the operating lever whereby a user moves the operating lever to engage the arm at a first position to enable the bellows pump to be reciprocated by the operating lever to pump liquid and subsequently the user moves the operating lever to disengage the arm to prevent the pumping of liquid.

* * * * *